United States Patent
Noda et al.

(10) Patent No.: US 9,870,866 B2
(45) Date of Patent: Jan. 16, 2018

(54) MULTILAYER ELECTRONIC COMPONENT

(71) Applicant: TDK CORPORATION, Tokyo (JP)

(72) Inventors: Yohei Noda, Tokyo (JP); Hirobumi Tanaka, Tokyo (JP); Hiroshi Shindo, Tokyo (JP); Yui Sugiura, Tokyo (JP); Tomomichi Gunji, Tokyo (JP); Keisuke Okai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/265,129

(22) Filed: Sep. 14, 2016

(65) Prior Publication Data

US 2017/0076870 A1    Mar. 16, 2017

(30) Foreign Application Priority Data

Sep. 15, 2015  (JP) .................................. 2015-182071

(51) Int. Cl.
    *H01G 4/30*     (2006.01)
    *H01G 4/224*    (2006.01)
    *H01G 4/232*    (2006.01)
    *H01G 4/12*     (2006.01)

(52) U.S. Cl.
    CPC .............. *H01G 4/30* (2013.01); *H01G 4/224* (2013.01); *H01G 4/232* (2013.01); *H01G 4/12* (2013.01)

(58) Field of Classification Search
    None
    See application file for complete search history.

(56) References Cited

U.S. PATENT DOCUMENTS

| | | | | |
|---|---|---|---|---|
| 4,658,328 A | * | 4/1987 | Sakabe ................. | H01G 4/232 361/309 |
| 6,965,167 B2 | * | 11/2005 | Liu ....................... | H01G 4/224 257/528 |
| 8,934,215 B2 | * | 1/2015 | Cho ....................... | H01G 4/30 361/301.1 |
| 2013/0201601 A1 | * | 8/2013 | Nishisaka ............ | H01G 13/006 361/301.4 |
| 2014/0096890 A1 | * | 4/2014 | Hamanaka ............. | H01G 4/30 156/89.12 |
| 2014/0177128 A1 | * | 6/2014 | Kim ....................... | H01G 4/12 361/301.4 |

(Continued)

FOREIGN PATENT DOCUMENTS

JP         2012-209493 A    10/2012

*Primary Examiner* — Dion R Ferguson
(74) *Attorney, Agent, or Firm* — Oliff PLC

(57) ABSTRACT

A multilayer electronic component includes an element body having an internal electrode layer and a dielectric layer. These are substantially parallel to a plane including a first axis and a second axis and are alternately laminated along a third axis direction. Side surfaces facing each other in the first axis direction are respectively equipped with an insulating layer. End surfaces facing each other in the second axis direction are respectively equipped with an external electrode. The insulating layer integrally has an insulating layer extension portion covering part of the end surfaces facing each other in the second axis direction. W1/W0 is 1/30 to less than 3/8, where W0 denotes a width along the first axis, and W1 denotes a width along the first axis of the insulating layer extension portion. The external electrode covers at least part of the insulating layer extension portion.

16 Claims, 11 Drawing Sheets

(56) References Cited

U.S. PATENT DOCUMENTS

| | | | |
|---|---|---|---|
| 2014/0334062 A1* | 11/2014 | Kim | H01G 4/12 361/301.4 |
| 2015/0041193 A1* | 2/2015 | Lee | H01G 4/12 174/258 |
| 2015/0043125 A1* | 2/2015 | Park | H01G 4/12 361/301.4 |
| 2015/0084481 A1* | 3/2015 | Mori | H01C 1/148 310/311 |
| 2015/0084487 A1* | 3/2015 | Mori | H01L 41/0472 310/364 |
| 2016/0139848 A1* | 5/2016 | Varanasi | G06F 12/0223 711/170 |
| 2016/0234979 A1* | 8/2016 | Lee | H01G 4/40 |

* cited by examiner

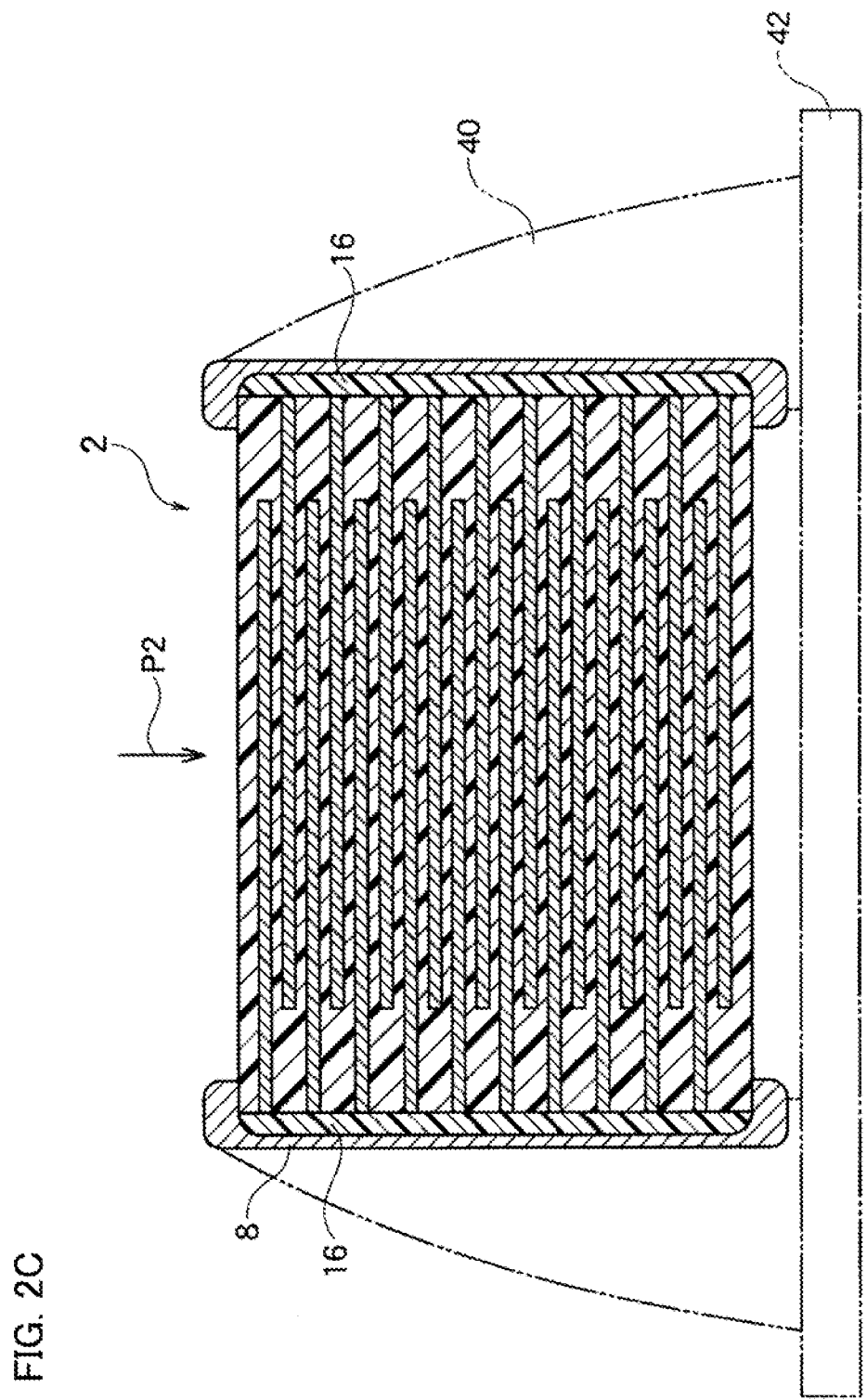

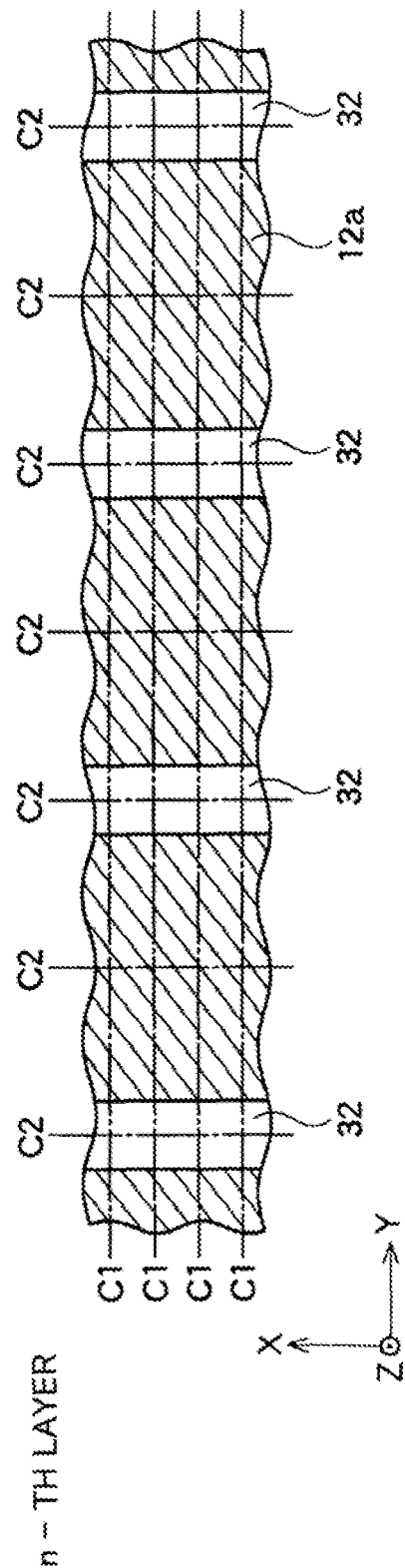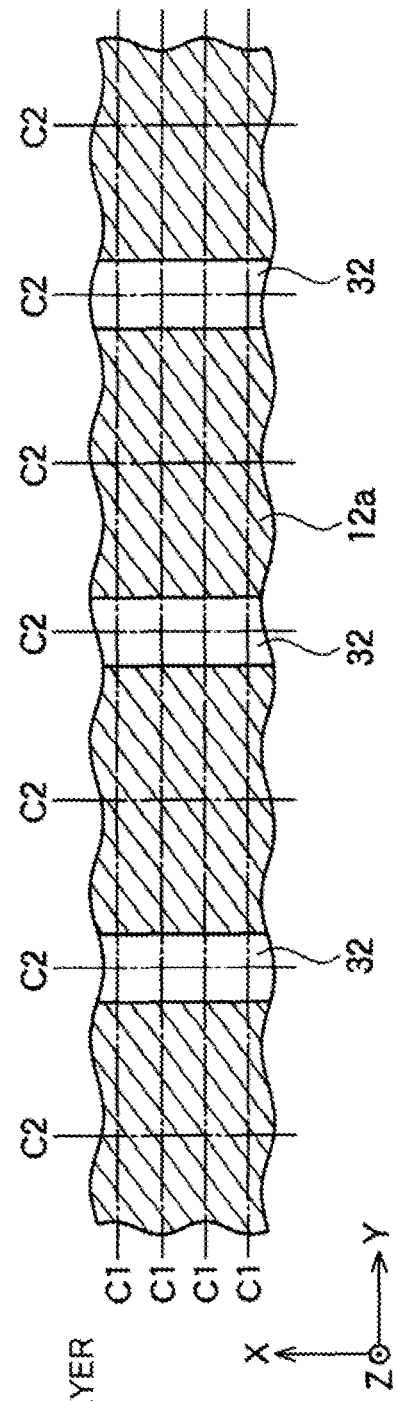

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

Patent Document 1 discloses a laminated capacitor equipped with an element body where internal electrode layers including a first internal electrode and a second internal electrode and intermediate internal electrode layers including a third internal electrode are alternatively laminated via dielectric layers.

This ceramic capacitor can prevent variation of electrostatic capacity due to lamination slippage even if lamination slippage with respect to a width direction of the third internal electrode is generated between the internal electrode layers and the intermediate internal electrode layers.

In the first internal electrodes and the second internal electrodes, a width of each lead electrode is smaller than a width of each active electrode portion. Thus, plating solution is hard to intrude at the time of forming a first terminal electrode and a second terminal electrode on a first end surface and a second end surface of the element body by plating, and it is possible to prevent reliability degradation of the laminated capacitor due to intrusion of plating solution.

However, the conventional technique has no choice but to reduce an area where the internal electrode and the external electrode are connected, and thus has a great difficulty in achieving small size and large capacity.

Patent Document 1: JP 2012-209493 A

SUMMARY OF THE INVENTION

The present invention has been made in view of the above circumstances, and an object thereof is to provide a multilayer electronic component having less variation of electrostatic capacity among products while preventing intrusion of plating solution.

Means for Solving Problem

In order to achieve the above object, the multilayer electronic component of the present invention is as follows.

[1] A multilayer electronic component comprising an element body having an internal electrode layer and a dielectric layer, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layer, the insulating layer integrally has an insulating layer extension portion covering part of the end surfaces facing each other in the second axis direction of the element body, W1/W0 is 1/30 to less than 3/8, where W0 denotes a width along the first axis of the element body and W1 denotes a width along the first axis of the insulating layer extension portion formed on the end surfaces in the second axis direction of the element body, and the external electrode covers at least part of the insulating layer extension portion formed on the end surfaces in the second axis direction of the element body.

According to the present invention, it is possible to provide a multilayer electronic component having less variation of electrostatic capacity among products while preventing intrusion of plating solution.

Incidentally, if plating solution intrudes into the element body, water ends up remaining inside a body of a multilayer electronic component, and characteristics, such as insulation resistance value, are deteriorated as using time passes, which is a problem causing degradation of reliability. The present invention can prevent intrusion of plating solution, and thus can prevent degradation of reliability.

As a specific aspect of [1] above, the following aspects are exemplified.

[2] The multilayer electronic component according [1], in which an angle $\theta 1$ made by a virtual line along the end surface of the element body and a tangential line of a curved surface of a peripheral edge portion of the insulating layer extension portion formed on the end surfaces in the second axis direction of the element body is 45 degrees or less.

[3] The multilayer electronic component according to [1] or [2], in which an elastic modulus of the insulating layer is 30 GPa to 100 GPa.

[4] The multilayer electronic component according to any of [1] to [3], in which $0.5 \leq Mf/Mt \leq 2.0$ is satisfied, where Mf denotes a maximum thickness in the second axis direction of the insulating layer from the end surface of the element body and Mt denotes a maximum thickness in the first axis direction of the insulating layer from the end surface (side surface) of the element body.

[5] The multilayer electronic component according to any of [1] to [4], in which the insulating layer is constituted by a glass component.

In addition, the method for manufacturing a multilayer electronic component for achieving the above object is not particularly limited, but examples thereof may include the following manufacturing method.

[6] A method for manufacturing the multilayer electronic component, the method including a step of obtaining a green laminate by laminating a green sheet having an internal electrode pattern layer that is continuous in a first axis direction and is substantially parallel to a plane including a first axis and a second axis formed in a third axis direction, a step of obtaining a green chip by cutting the green laminate so as to obtain a cutting plane parallel to a plane including a second axis and a third axis, a step of obtaining an element body having an internal electrode layer and a dielectric layer alternately laminated by calcining the green chip, a step of obtaining a ceramic sintered body having an insulating layer formed by coating and baking a paste for insulating layer on an end surface in the first axial direction of the element body, and a step of obtaining a multilayer electronic component where an external electrode is formed by baking a paste for external layer on an end surface in the second axial direction of the ceramic sintered body, in which the insulating layer integrally has an insulating layer extension portion covering part of the end surfaces facing each other in the second axis direction of the element body, $W_1/W_0$ is 1/30 to less than 3/8, where $W_0$ denotes a width along the first axis of the element body and $W_1$ denotes a width along the first axis of the insulating layer extension portion formed on the end surfaces in the second axis direction of the element body, and the external electrode covers at least part of the insulating layer extension portion formed on the end surfaces in the second axis direction of the element body.

BRIEF DESCRIPTION OF THE DRAWINGS

FIG. 2C is a cross-sectional view taken along the line IIC-IIC illustrated in FIG. 2B.

FIG. 5Aa is a plan view illustrating a portion of the n-th internal electrode pattern layer taken along the line V-V illustrated in FIG. 4.

FIG. 5Ab is a plan view illustrating a portion of the n+1-th internal electrode pattern layer.

DESCRIPTION OF THE PREFERRED EMBODIMENTS

Figure 1:
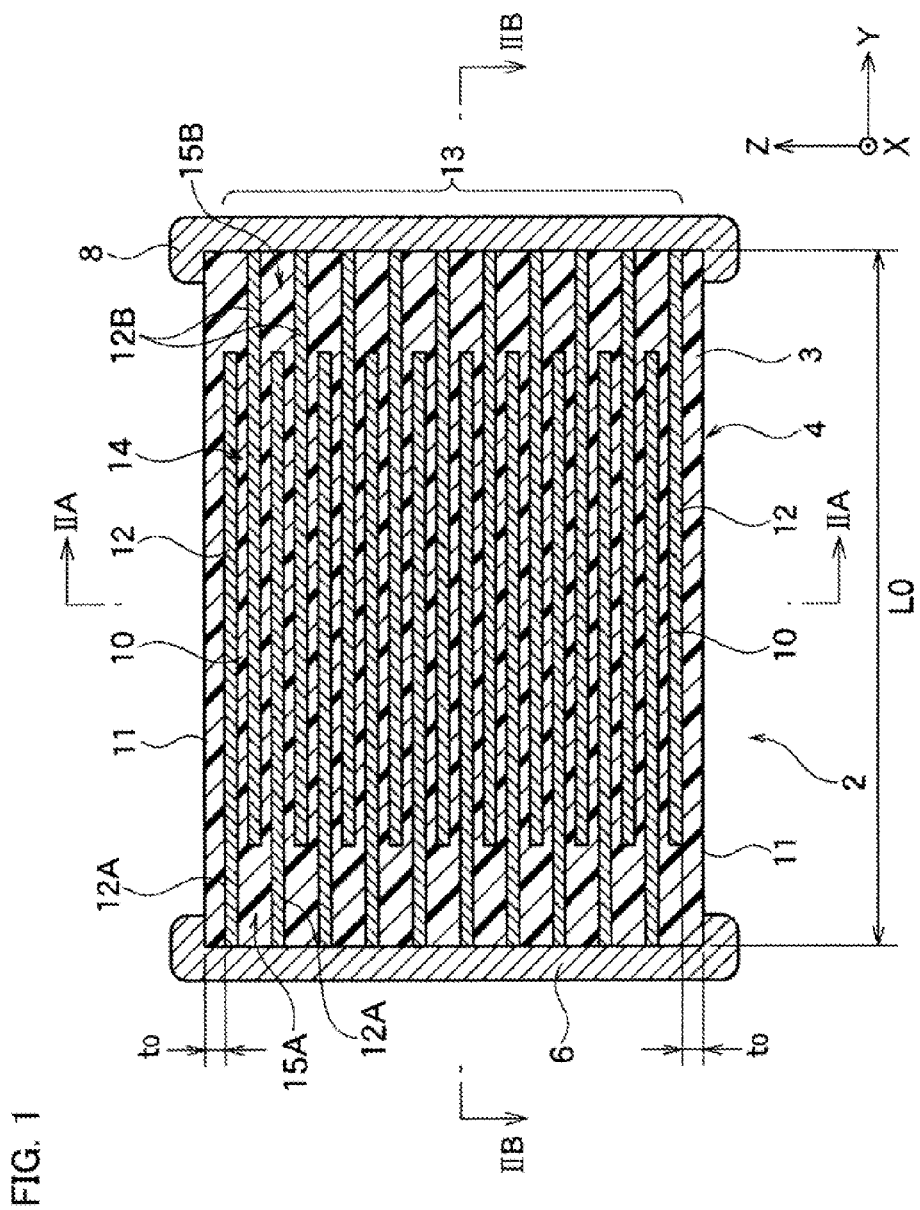
FIG. 1 is a schematic cross-sectional view of the multi-layer ceramic capacitor according to an embodiment of the present invention.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

Overall Configuration of Multilayer Ceramic Capacitor

As an embodiment of the laminated electronic component according to the present embodiment, the overall configuration of a multilayer ceramic capacitor will be described.

As illustrated in FIG. 1, a multilayer ceramic capacitor 2 according to the present embodiment includes a ceramic sintered body 4, a first external electrode 6, and a second external electrode 8. In addition, as illustrated in FIG. 2, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer and the inner dielectric layer may be a little irregular or tilted.

The portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ or an alkali niobate-based ceramic as a main component.

In $ABO_3$, for example, A is at least one kind such as Ca, Ba, or Sr, and B is at least one kind such as Ti or Zr. The molar ratio of A/B is not particularly limited, and it is from 0.980 to 1.020.

In addition to this, examples of an accessory component may include silicon dioxide, aluminum oxide, magnesium oxide, an alkali metal compound, an alkaline earth metal compound, manganese oxide, a rare earth element oxide, and vanadium oxide, but it is not limited to these. The content thereof may also be appropriately determined in accordance with the composition and the like.

Incidentally, it is possible to lower the calcination temperature by using silicon dioxide and aluminum oxide as the accessory component. In addition, the lifespan can be improved by using magnesium oxide, an alkali metal compound, an alkaline earth metal compound, manganese oxide, a rare earth element oxide, and vanadium oxide as the accessory component.

In the present embodiment, the number of lamination of the inner dielectric layer 10 and the outer dielectric layer may be appropriately determined in accordance with the application and the like.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

The conductive material contained in the internal electrode layer 12 is not particularly limited, and it is possible to use a metal such as Ni, Cu, Ag, Pd, Al, or Pt and an alloy thereof. As a Ni alloy, an alloy of Ni with one or more kinds of elements selected from Mn, Cr, Co, or Al is preferable, and the Ni content in the alloy is preferably 95 wt % or more. Incidentally, various kinds of trace components such as P may be contained in Ni or a Ni alloy at about 0.1 wt % or less.

The internal electrode layer 12 may be formed by using a commercially available electrode paste, and the thickness of the internal electrode layer 12 may be appropriately determined in accordance with the application and the like.

As illustrated in FIG. 2, the both end surfaces in the X-axis direction of the ceramic sintered body 4 are equipped with the insulating layers 16 covering ends of the internal electrode layers 12 of the element body 3.

In the present embodiment, a reaction phase generated by the diffusion of at least one of the constituents of the insulating layer 16 to the inner dielectric layer 10 may be formed at the interface between the insulating layer 16 and the inner dielectric layer 10. By having a reaction phase at the interface between the insulating layer 16 and the inner dielectric layer 10, the side surfaces of the element body 3 are embedded in glass and the porosity at the interface can be suppressed to the minimum. This improves the insulating properties of the end surface of the element body 3 and makes it possible to improve the voltage endurance. In addition, by having a reaction phase at the interface between the insulating layer 16 and the dielectric layer 10, it is possible to improve the adhesive properties at the interface between the insulating layer 16 and the dielectric layer. This suppresses the delamination of the element body 3 and the insulation layer 16 and makes it possible to enhance the bending strength thereof.

With regard to the acknowledgement of reaction phase, for example, the STEM-EDS analysis of the Si element at the interface between the dielectric layer and insulating layer of the ceramic sintered body is conducted to obtain the mapping data of the Si element, and the place at which the Si element is present is acknowledged as the reaction phase.

In the present embodiment, the end portion in the X-axis direction of the internal electrode layer 12 sandwiched between the inner dielectric layers 10 adjacent in the laminating direction (Z-axis direction) is recessed on the end surface in the X-axis direction of the element body 3, namely, at the predetermined retraction distance from the X-axis direction end portion to the inner side of the dielectric layer 10. The retraction distance may be different from each internal electrode layer 12, but its average is zero or more, for example, and is preferably 0.01 to 1 µm.

Incidentally, retraction of the ends in the X-axis direction of the internal electrode layers 3 can be removed by polishing, such as barrel polishing, the end surfaces in the X-axis direction of the element body 3 before forming the insulating layers 16. The retraction of the X-axis direction end portion of the internal electrode layer 12 is formed, for example, by the difference in sintering shrinkage factor between the material to form the internal electrode layer 12 and the material to form the inner dielectric layer 10.

The insulating layers 16 according to the present embodiment integrally have insulating layer extension portions 16a covering both ends in the X-axis direction of the end surfaces in the Y-axis direction of the element body 3. Also, as illustrated in FIG. 2B, both ends in the X-axis direction of the external electrodes 6 and 8 cover at least part of the insulating layer extension portions 16a formed on the end surfaces in the Y-axis direction of the element body 3.

An elastic modulus of the insulating layer 16 according to the present embodiment is 30 GPa to 100 GPa.

Conventionally, there is a problem that an element body is deformed in the X-axis direction due to electrostriction of the dielectric layer at the time of applying high voltage to a multilayer ceramic capacitor. As illustrated in FIG. 2C, when a multilayer ceramic capacitor is mounted on a printed circuit board by soldering, there is also a problem that stress concentrates on corners of a multilayer ceramic capacitor at the time of addition of force by deflection in the P2 direction.

In contrast, the insulating layers 16 according to the present embodiment integrally have insulating layer extension portions 16a covering both ends in the X-axis direction of the end surfaces in the Y-axis direction of the element body 3, and also have a predetermined elastic modulus that is lower than that of the dielectric layer. This can prevent deformation in the X-axis direction of the element body due to electrostriction of the dielectric layer caused by high voltage, and ease stress by deflection and stress by electrostriction transmitted to a printed circuit board. As a result, structural defect due to electrostriction or deflection can be reduced.

Figure 2A:
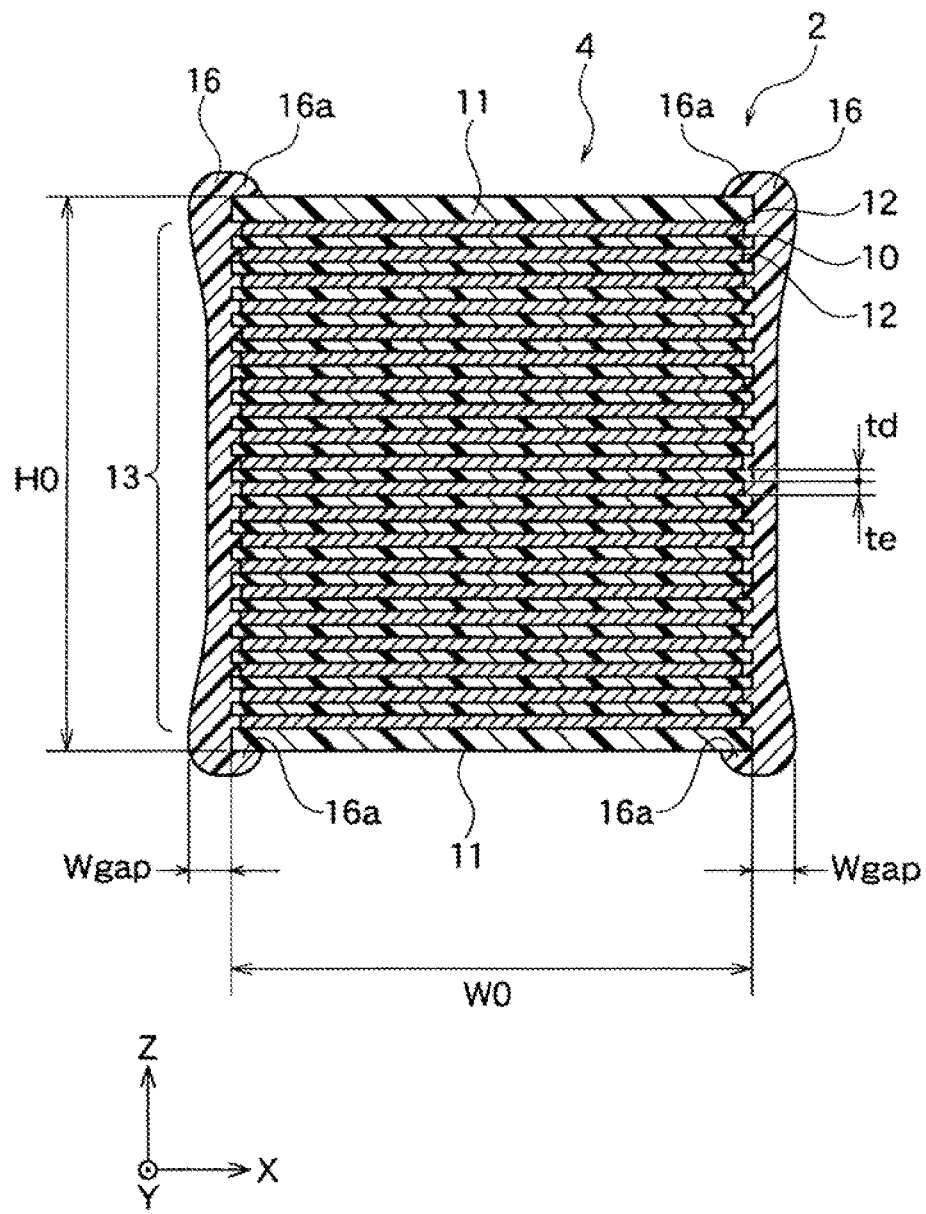
FIG. 2A is a cross-sectional view taken along the line IIA-IIA illustrated in FIG. 1.
Figure 2B:
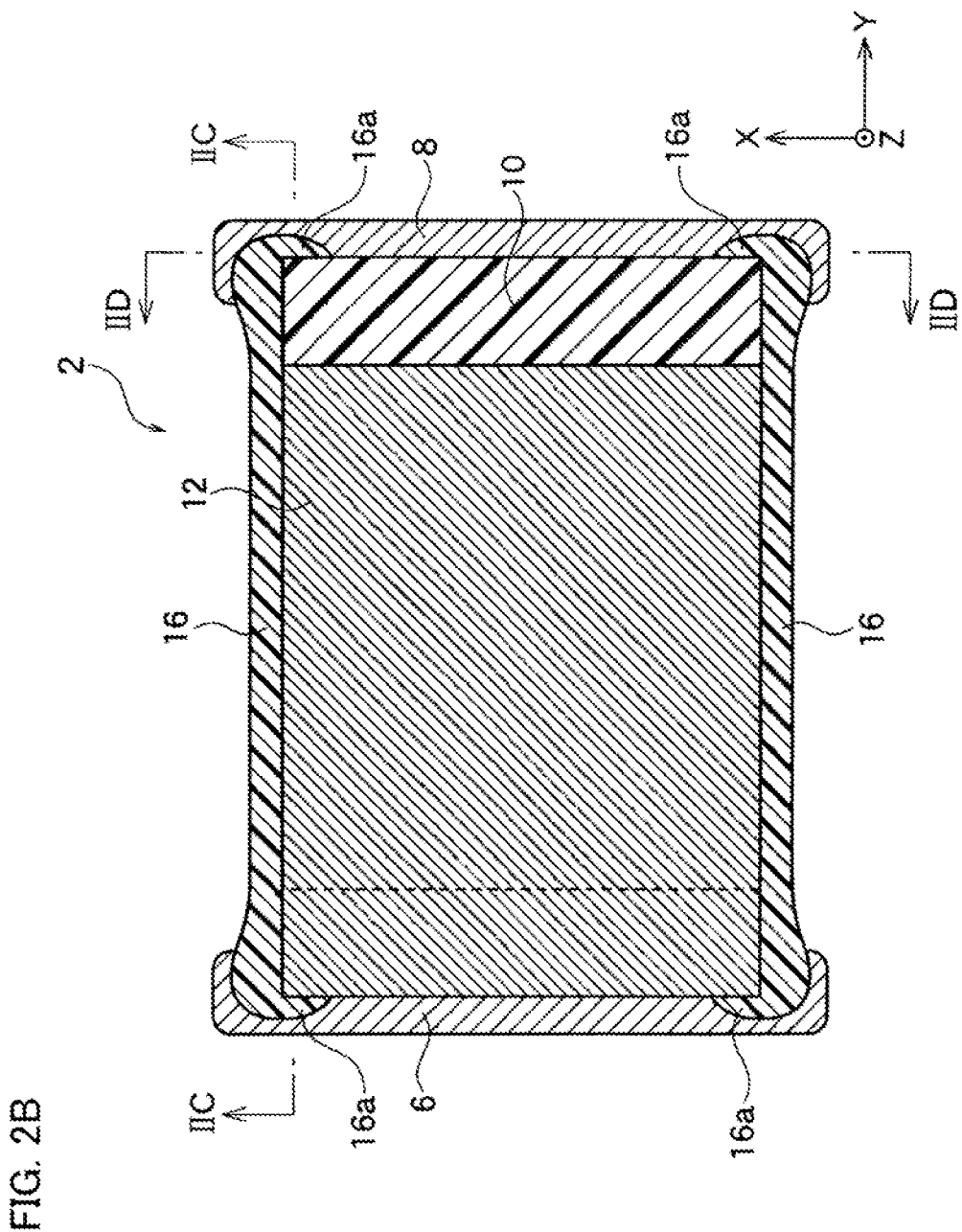
FIG. 2B is a cross-sectional view taken along the line IIB-IIB illustrated in FIG. 1.
Figure 2D:
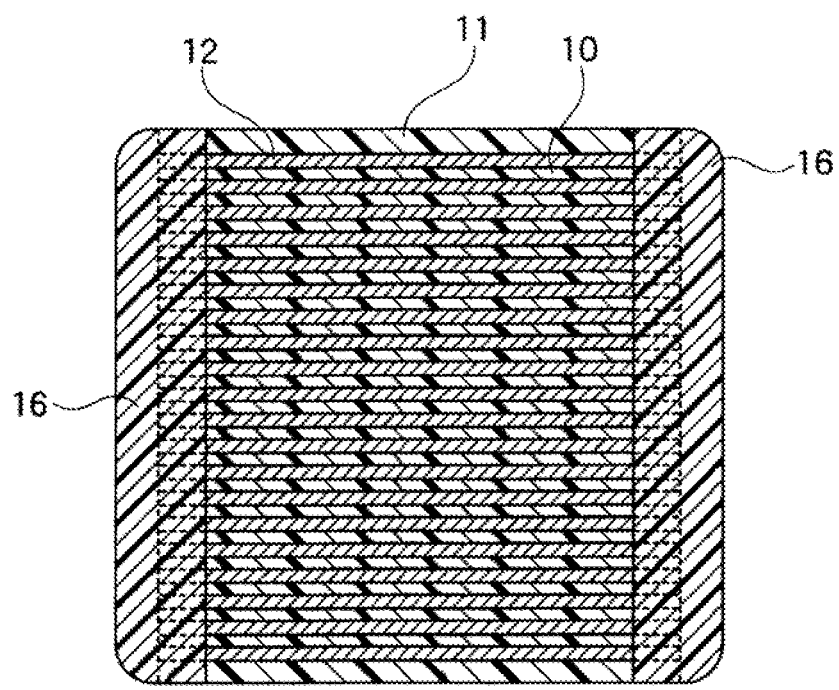
FIG. 2D is a cross-sectional view of a ceramic sintered body taken along the line IID-IID illustrated in FIG. 2B.
Figure 2D:
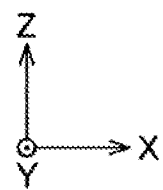
Figure 3:
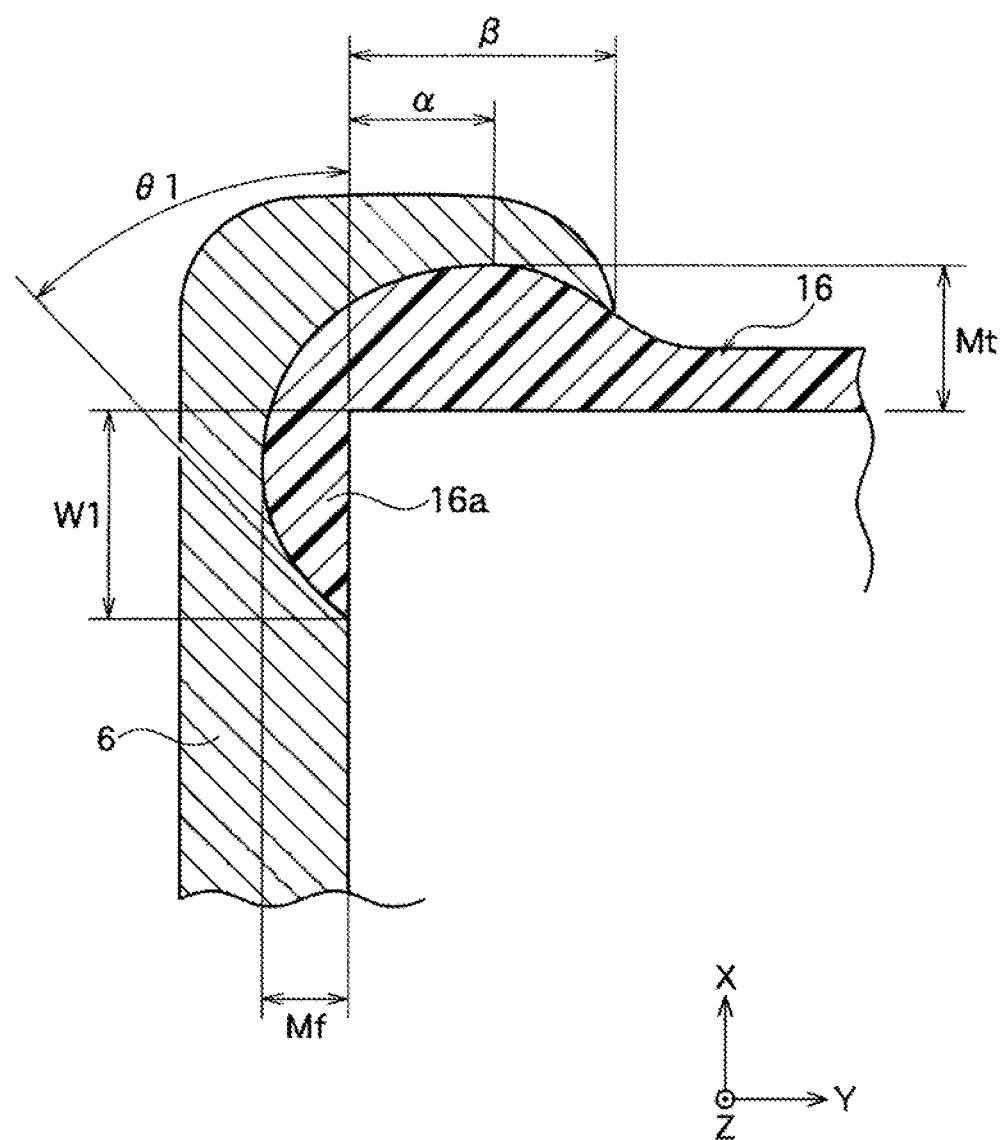
FIG. 3 is a fragmentary cross-sectional view of FIG. 2B.

From the above point of view, as illustrated in FIG. 2B and FIG. 3, the external electrodes 6 and 8 preferably cover the insulating layer extension portions 16a and the ends in the Y-axis direction of the insulating layers 16 formed on the end surfaces in the X-axis direction.

Incidentally, when an elastic modulus of the insulating layers 16 is 30 GPa to 100 GPa, the insulating layers 16 themselves can withstand deformation of the insulating layers 16, and structural defect, such as crack or peeling of the insulating layers 16, tends to be reduced, compared with when an elastic modulus of the insulating layers 16 is lower than 30 GPa.

Also, when an elastic modulus of the insulating layers 16 is 30 GPa to 100 GPa, stress by electrostriction can be sufficiently eased, and an effect of crack prevention at corners can be demonstrated, compared with when an elastic modulus of the insulating layers 16 is higher than 100 GPa.

From the above point of view, an elastic modulus of the insulating layer 16 is preferably 40 GPa to 90 GPa, and more preferably 50 GPa to 90 GPa.

As illustrated in FIG. 2A, the insulating layer 16 may have the insulating layer extension portion 16a covering part of the end in the X-axis direction on both end surfaces in the Z-axis direction of the element body 3. Furthermore, in the present embodiment, both ends in the Z-axis direction of the external electrodes 6 and 8 illustrated in FIG. 1 do not cover both ends in the Y-axis direction of the insulating layer 16 illustrated in FIG. 2A from both sides in the Z-axis direction, but may cover them.

The softening point of the insulating layer 16 is preferably 500° C. to 1000° C. This can prevent structural defect that can be generated in the preceding or following step. From the above point of view, the softening point of the insulating layer 16 is preferably 500° C. to 1000° C.

The insulating layer 16 according to the present embodiment has any component satisfying the above elastic modulus, such as ceramic, aluminum, glass, and titanium, and such as resin of epoxy resin, but is preferably composed of glass component. In addition, the fixing strength is improved by constituting the insulating layer 16 by a glass component. It is considered that this is because a reaction phase is formed at the interface between the glass and the element body 3 and thus the adhesive properties between the glass and the element body 3 is superior to other insulating materials.

Incidentally, the reaction phase is a phase where at least one of the constituents of the insulating layer is diffused in the dielectric layer.

The glass component includes $SiO_2$ based glass, $Bi_2O_3$ based glass, ZnO based glass, and the like.

By covering the end surface of the element body 3 with the insulating layer 16, not only the insulating properties are enhanced but also the durability and moisture resistance to the environmental impact from the outside are enhanced. In addition, a side gap is formed by covering the end surface in the X-axis direction of the element body 3 with the insulating layer 16, and thus the width of the side gap is small and a uniform insulating layer 16 can be formed.

When using a glass component for the insulating layer 16, moisture resistance is improved due to high sealing property. Also, when using resin for the insulating layer 16, there is a merit that stress is easy to be eased due to small elastic modulus.

Incidentally, when using resin for the insulating layer 16, filler is preferably contained.

The insulating layer 16 according to the present embodiment is composed of any glass component including alkali metal oxide of $SiO_2$, $B_2O_3$, BaO, SrO, and Na, ZnO, $TiO_2$, $Al_2O_3$, and CaO, for example, but $SiO_2$ and $Al_2O_3$ are preferably contained. This can improve plating resistance of glass.

The insulating layer 16 according to the present embodiment preferably contains $Bi_2O_3$ and $Na_2O$ of less than 5 mass %, respectively. This can improve plating resistance. From the above point of view, the insulating layer 16 according to the present embodiment more preferably contains $Bi_2O_3$ and $Na_2O$ of 0 to 3 mass %, respectively.

The material of the external electrodes 6 and 8 is not limited either, but a well-known conductive material, such as Cu, Ag, Pd, Pt, Au, alloy thereof, and conductive resin, can be used. The thickness of the external electrodes 6 and 8 may be appropriately determined in accordance with the application and the like.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

The shape or size of the element body 3 may be appropriately determined in accordance with the purpose or application, but it is preferable that the width W0 in the X-axis direction is from 0.1 mm to 1.6 mm, the length L0 in the Y-axis direction is from 0.2 mm to 3.2 mm, and the height H0 in the Z-axis direction is from 0.1 mm to 1.6 mm.

According to the manufacturing method of the present embodiment to be described later, it is possible to improve the acquisition capacity as compared to that in the prior art. At this time, the effect is more remarkable when the size of the element body 3 is the size described above. From the above point of view, the size of the element body 3 of the present embodiment is preferably as follows. The width W0 in the X-axis direction is from 0.1 mm to 0.5 mm, the length L0 in the Y-axis direction is from 0.2 mm to 1.0 mm, and the height H0 in the Z-axis direction is from 0.1 mm to 0.5 mm.

In the present embodiment, as illustrated in FIG. 2A, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4, but the width Wgap is not necessarily uniform along the Z-axis direction but may be a bit varied. The average of the width Wgap is preferably 0.5 μm to 30 μm, which is significantly small, compared with the width W0 of the element body 3. In the present embodiment, the width Wgap can be significantly reduced compared with a conventional one, and a retraction length of the internal electrode layer 12 is sufficiently small. Thus, in the present embodiment, a multilayer capacitor having small size and large capacitance can be obtained.

Incidentally, the width W0 of the element body 3 coincides with the width along the X-axis direction of the inner dielectric layer 10.

By setting Wgap to be within the above range, a decrease in electrostatic capacity is small even when the ceramic sintered body 4 is more compact as well as cracking hardly occurs.

In the present embodiment, as illustrated in FIG. 3, the insulating layer extension portion 16a covering both ends in the X-axis direction on both end surfaces in the Y-axis direction of the element body 3 is integrally formed with the insulating layer 16 at both ends in the Y-axis direction of the insulating layer 16. W1/W0 is 1/30 to less than 3/8, where W1 denotes a width along the X-axis direction of the insulating layer extension portion 16a from the end surface in the X-axis direction of the element body 3.

When W1/W0 is 1/30 or more, the end surface in the Y-axis direction of the element body 3 is sufficiently protected by the insulating layer 16 compared with when W1/W0 is less than 1/30, and thus plating solution can be sufficiently prevented from intruding in the plating step after baking a metal paste film to be part of the external electrodes 6 and 8. When measuring a ratio of plating component present in the interface between the external electrodes 6 and 8 and the ceramic sintered body 4 after the plating step, it is actually found that the ratio can be reduced.

When W1/W0 is less than 3/8, an area where the internal electrode layer 12 is exposed is not enough on the end surface in the Y-axis direction of the element body 3 compared with when W1/W0 is 3/8 or more, and thus the conduction between the internal electrode layer 12 and the external electrodes 6 and 8 is easy to be freed, and variation of electrostatic capacity is prevented.

From the above point of view, W1/W0 is more preferably 1/20 to 1/3.

The width W1 can be controlled by adjusting a thickness in the X-axis direction of paste for insulating layer mentioned below.

As illustrated in FIG. 3, in the present embodiment, an angle θ1 made by a virtual line along the end surface of the element body 3 and a tangential line of a curved surface of a peripheral edge portion of the insulating layer extension portion 16a is 45 degrees or less. When the angle θ1 of the peripheral edge portion of the insulating layer extension portion 16a is 45 degrees or less, stress is hard to concentrate on the peripheral edge portion of the insulating layer extension portion 16a present on the end surface in the Y-axis direction, and crack generated from the peripheral edge portion of the insulating layer 16 can be significantly prevented, compared with when the angle of the peripheral edge portion is less than 45 degrees.

From the above point of view, the angle θ1 is more preferably 10 degrees to 40 degrees.

For example, the angle θ1 can be controlled by adjusting viscosity of paste for insulating layer mentioned below or baking retention time at the time of baking paste for insulating layer on the element body 3.

It is preferable to satisfy $0.5 \leq Mf/Mt \leq 2.0$, where Mf denotes a maximum thickness in the Y-axis direction of the insulating layer 16 from the end surface in the Y-axis direction of the element body 3, and Mt denotes a maximum thickness in the X-axis direction of the insulating layer 16 from the end surface in the X-axis direction of the element body 3. This improves fixing strength at the time of mounting.

When $0.5 \leq Mf/Mt \leq 2.0$ is satisfied, coating on the end surface side in the Y-axis direction is enough, and influence of crack by electrostriction is hard to occur, compared with when Mf/Mt is less than 0.5.

When $0.5 \leq Mf/Mt \leq 2.0$ is satisfied, soldering at the time of mounting is favorably performed, and fixing strength between solder and the external electrodes 6 and 8 is good, compared with Mf/Mt is more than 2.0.

From the above point of view, Mf/Mt is more preferably 0.8 to 1.5.

For example, Mf/Mt can be controlled by adjusting dipping time of past for insulating layer mentioned below to the element body 3, the number of dippings, or the like.

Mf is preferably 5 μm to 20 μm. This can reduce acoustic noise.

As illustrated in FIG. 3, $1/30 \leq \alpha/\beta < 1$ is preferably satisfied, where α denotes a length along the Y-axis direction from the end in the Y-axis direction of the element body 3 to the portion of Mt, and β denotes a coating length along the Y-axis direction of the external electrodes 6 and 8 covering the insulating layer 16 from the end in the Y-axis direction of the element body 3.

When $1/30 \leq \alpha/\beta < 1$ is satisfied, the coating length of the external electrodes 6 and 8 is small, and the incidence rate of short circuit due to extension of plating covering the external electrodes 6 and 8 can be made low, compared with when $\alpha/\beta$ is less than 1/30.

In contrast, when $1/30 \leq \alpha/\beta < 1$ is satisfied, the coating strength of the external electrodes 6 and 8 is large, and fixing strength can be made good, compared with when $\alpha/\beta$ is 1 or more.

Mt/β is preferably 1/30 to 1/10. This can improve thermal shock resistance and fixing strength.

The widths Wgap of both sides in the X-axis direction of the ceramic sintered body 4 may be the same as or different from each other. The widths W1 of both sides in the X-axis direction of the ceramic sintered body 4 may be the same as or different from each other.

It is preferable that the insulating layer 16 does not largely cover both end surfaces in the Y-axis direction of the element body 3 illustrated in FIG. 1. This is because the external electrodes 6 and 8 need to be formed on both end surfaces in the Y-axis direction of the element body 3 and need to be connected to the internal electrodes 12.

The ratio of the thickness td of the inner dielectric layer 10 to the thickness te of the internal electrode layers 12 is not particularly limited, and it is preferable that td/te is from 2 to 0.5. In addition, the ratio of the thickness to of the exterior region 11 to the height H0 of the element body 3 is not particularly limited, and it is preferable that to/H0 is from 0.01 to 0.05.

Method for Manufacturing Multilayer Ceramic Capacitor

Next, a method for manufacturing the multilayer ceramic capacitor 2 as an embodiment of the present invention will be specifically described.

The multilayer ceramic capacitor 2 is manufactured by making green chips with an ordinary printing method, sheet method, or the like using paste, firing this, applying paste for insulating layer thereto, performing baking, and performing firing after printing or transcripting the external electrodes 6 and 8.

First, a paste for inner green sheet and a paste for outer green sheet are prepared in order to manufacture an inner green sheet 10a to constitute the inner dielectric layer 10 illustrated in FIG. 1 after calcination and an outer green sheet 11a to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 μm or less and preferably about from 0.1 to 0.3 μm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as an alcohol, acetone, and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dibutyl phthalate, dioctyl phthalate or benzyl butyl phthalate, adipic acid, an ester of phosphoric acid, and a glycol.

Next, a paste for internal electrode layer is prepared in order to manufacture an internal electrode pattern layer 12a to constitute the internal electrode layers 12A and 12B illustrated in FIG. 1 after calcination. The paste for internal electrode layer is prepared by kneading a conductive material composed of various kinds of conductive metals or alloys described above with the organic vehicle described above.

When using Ni as the conductive material, Ni powder prepared by using a commercially available CVD method, wet chemical reduction method, or the like may be used.

The paste for external electrode to constitute the external electrodes 6 and 8 illustrated in FIG. 1 after calcination may be prepared in the same manner as the paste for internal electrode layer described above.

Figure 4:
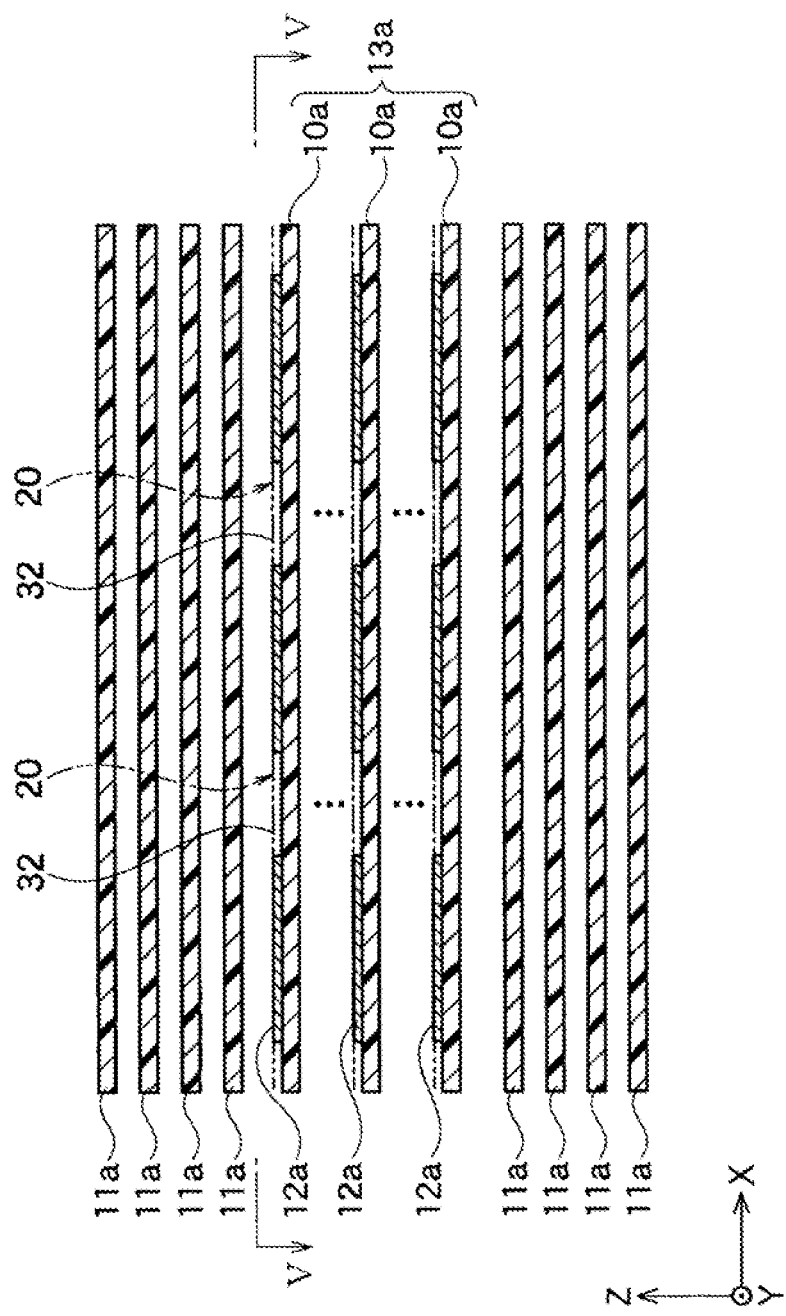
FIG. 4 is a schematic cross-sectional view illustrating the step of laminating a green sheet in the manufacturing process of a multilayer ceramic capacitor illustrated in FIG. 1.

The inner green sheet 10*a* and the internal electrode pattern layer 12*a* are alternately laminated as illustrated in FIG. 4 by using the paste for inner green sheet and the paste for internal electrode layer prepared in the above to manufacture an internal laminate 13*a*. In addition, after the internal laminate 13*a* is manufactured, the outer green sheet 11*a* is formed thereon by using the paste for outer green sheet, and the resultant is pressurized in the laminating direction to obtain a green laminate.

Incidentally, as a method for manufacturing the green laminate, in addition to the above, a green laminate may be obtained by alternately laminating a predetermined number of the inner green sheet 10*a* and the internal electrode pattern layer 12*a* directly on the outer green sheet 11*a* and pressurizing the resultant in the laminating direction.

Specifically, first, the inner green sheet 10*a* is formed on a carrier sheet (for example, a PET film) as a support by a doctor blade method. The inner green sheet 10*a* is dried after being formed on the carrier sheet.

Next, as illustrated in FIG. 4, the internal electrode pattern layer 12*a* is formed on the surface of the inner green sheet 10*a* by using the paste for internal electrode layer to obtain the inner green sheet 10*a* having the internal electrode pattern layer 12*a*.

At this time, as illustrated in FIG. 5Aa, a gap 32 of the internal electrode pattern layer 12*a* is formed in the Y-axis direction and a continuous flat internal electrode pattern layer 12*a* is formed in the X-axis direction at the n-th layer.

Next, as illustrated in FIG. 5Ab, the gap 32 of the internal electrode pattern layer 12*a* is formed in the Y-axis direction and a continuous flat internal electrode pattern layer 12*a* is formed in the X-axis direction at the (n+1)-th layer as well. At this time, the gaps 32 of the internal electrode pattern layer of the n-th layer and the (n+1)-th layer are formed so as not to overlap each other in the Z axis direction of the laminating direction.

In this manner, the internal laminate 13*a* is manufactured by laminating a plurality of the inner green sheet 10*a* having the internal electrode pattern layer 12*a*, an appropriate number of the outer green sheets 11*a* is then formed above and below the internal laminate 13*a* by using the paste for outer green sheet, and the resultant is pressurized in the laminating direction to obtain a green laminate.

Figure 5B:
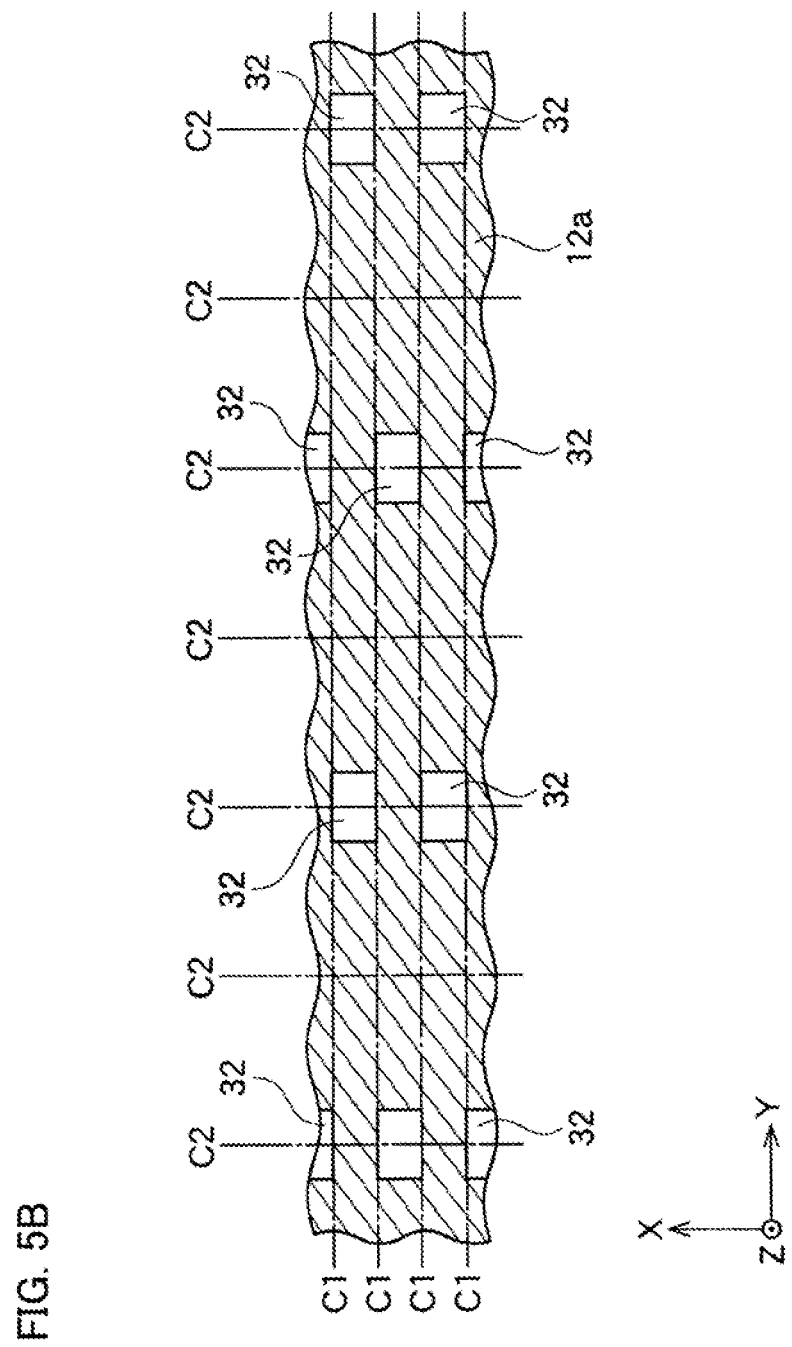
FIG. 5B is a plan view illustrating a portion of the internal electrode pattern layer taken along the line V-V illustrated in FIG. 4.
Figure 6A:
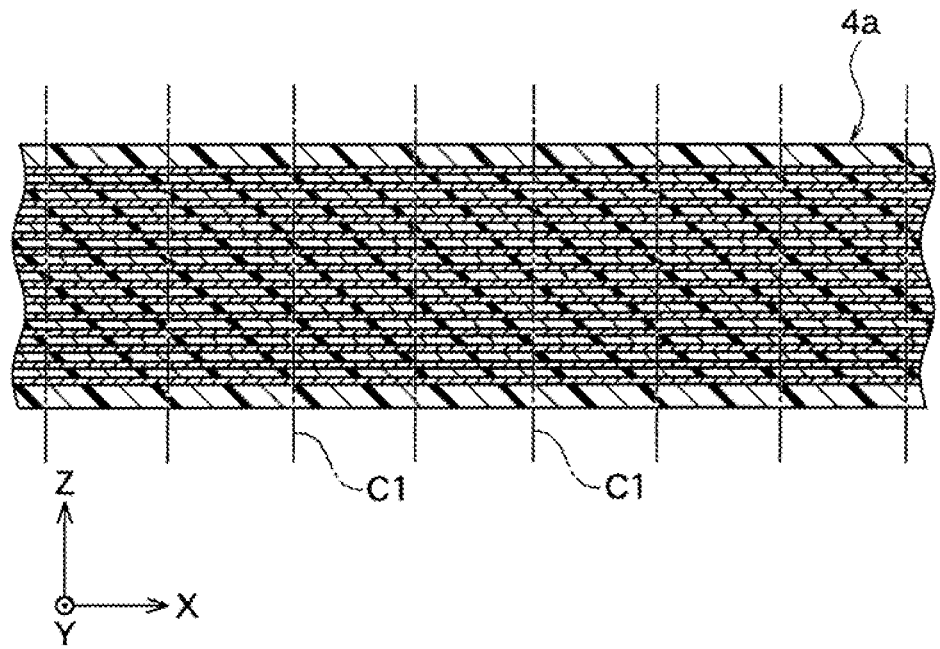
FIG. 6A is a schematic cross-sectional view of the laminate after lamination of the green sheet illustrated in FIG. 4 parallel to the X-Z-axis plane.
Figure 6B:
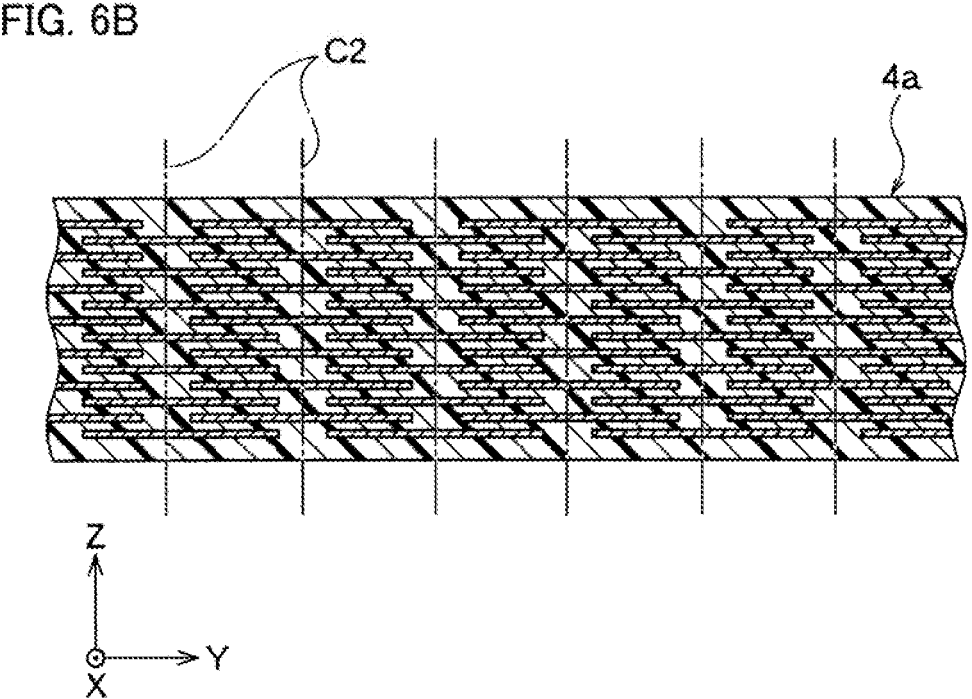
FIG. 6B is a schematic cross-sectional view of the laminate after the lamination of the green sheet illustrated in FIG. 4 parallel to the Y-Z-axis plane.

Next, the green laminate is cut along a cutting plane C1 and a cutting plane C2 in FIG. 5Aa, FIG. 5Ab, FIG. 6A, and FIG. 6B to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12*a* at the n-th layer cuts the gap 32 of the internal electrode pattern layer 12*a*. In addition, the cutting plane C2 which has cut the internal electrode pattern layer 12*a* at the n-th layer cuts the gap 32 of the internal electrode pattern layer 12*a* at the (n+1)-th layer.

By obtaining the green chip by such a cutting method, the n-th internal electrode pattern layer 12*a* of the green chip is configured to be exposed on one cutting plane and not to be exposed on the other cutting plane in the cutting plane C2 of the green chip. In addition, the (n+1)-th internal electrode pattern layer 12*a* of the green chip has a configuration in which the internal electrode pattern layer 12*a* is not exposed on the other cutting plane on which the internal electrode pattern layer 12*a* is exposed at the n-th layer and the internal electrode pattern layer 12*a* is exposed on one cutting plane on which the internal electrode pattern layer 12*a* is not exposed at the n-th layer on the cutting plane C2 of the green chip.

Furthermore, the internal electrode pattern layer 12*a* is configured to be exposed in all of the layers on the cutting plane C1 of the green chip.

In addition, the method for forming the internal electrode pattern layer 12*a* is not particularly limited, and it may be formed by a thin film forming method such as vapor deposition or sputtering other than a printing method and a transcription method.

In addition, a step absorbing layer 20 may be formed at the gap 32 of the internal electrode pattern layer 12*a*. The step on the surface of the green sheet 10*a* due to the internal electrode pattern layer 12*a* is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12*a*, for example. The step absorbing layer 20 contains a ceramic powder and an organic vehicle which are the same as those in the green sheet 10*a*, but it is formed by a printing method unlike the green sheet 10*a*, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

Known conditions may be set for the binder removal step, and for example, the retention temperature may be set to from 200 to 400° C.

In the present embodiment, the calcination step and the annealing step are conducted in a reducing atmosphere. Other calcination conditions or other annealing conditions may be known conditions, and for example, the retention temperature for calcination is from 1000° C. to 1300° C., and the retention temperature for annealing is from 500° C. to 1000° C.

The binder removal step, the calcination step, and the annealing step may be conducted continuously or independently.

The both end surfaces in the Y-axis direction and/or the both end surfaces in the Z-axis direction of the element body 3 obtained as described above may be polished, for example, by barrel polishing or sandblasting if necessary.

Next, paste for insulating layer is applied and baked on the both end surfaces in the X-axis direction of the element body 3 so as to form the insulating layer 16 and obtain the ceramic sintered body 4 illustrated in FIG. 1 and FIG. 2A. With this insulating layer 16, not only the insulating properties are enhanced but also the moisture resistance is favorable.

In the case of coating the paste for insulating layer, the paste may be coated not only on the both end portions in the X-axis direction of the element body 3 but also on the both end portions in the X-axis direction of the both end surfaces in the Y-axis direction of the element body 3. In addition, the paste may be coated on the both end portions in the X-axis direction of the both end surfaces in the Z-axis direction of the element body 3.

In the case of constituting the insulating layer by glass, this paste for insulating layer may be obtained, for example, by kneading the raw material for glass described above, a binder containing ethyl cellulose as the main component, and terpineol and acetone of the dispersion medium by a mixer.

The element body 3 is coated with the paste for insulating layer by any coating method, such as dipping, printing, coating, vapor deposition, and spraying, but is preferably coated by dipping in view of adjusting W1/W0 or Mf/Mt.

The ceramic sintered body 4 is obtained by coating the paste for insulating layer on the element body 3, drying, subjecting to the binder removal treatment, and baking the paste.

The element body 3 to which the paste for insulating layer is applied is baked under any conditions, such as in an atmosphere of humidified $N_2$ or dry $N_2$, at 700° C. to 1300° C., retained for 2 minutes to 60 minutes.

The glass component that is liquefied at the time of baking easily penetrates into the gap from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

The both end surfaces in the Y-axis direction and/or the both end surfaces in the Z-axis direction of the ceramic sintered body 4 obtained as described above may be polished, for example, by barrel polishing, sandblasting, or the like if necessary.

Next, the paste for external electrode is coated and baked on the both end surfaces in the Y-axis direction of the ceramic sintered body 4 on which the insulating layer 16 is baked to form the external electrodes 6 and 8. The formation of the external electrodes 6 and 8 may be conducted after the formation of the insulating layer 16 or may be simultaneously conducted with the formation of the insulating layer 16, and preferably it is conducted after the formation of the insulating layer 16.

The method for forming the external electrodes 6 and 8 is not particularly limited, and it is possible to use an appropriate method such as coating and baking of the paste for external electrode (metal paste), plating, vapor deposition, or sputtering.

If necessary, the external electrodes 6 and 8 may be obtained by forming a covering layer with plating or so on the surface of the metal paste-baked film to be a base film of the external electrodes 6 and 8.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is formed on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

In the prior art, a portion of the dielectric layer is conventionally adopted as a gap portion, and thus layering shift and cutting shift in the X-axis direction are easy to occur, which causes variation of electrostatic capacity. In contrast, in the present embodiment, part of the dielectric layer is not adopted as a gap portion, but the cut and sintered element body where the insulating layer is formed is adopted as part of a gap potion. This makes it possible to prevent the layering shift and cutting shift in the X-axis direction and prevent variation of electrostatic capacity.

In addition, in the present embodiment, the insulating layer 16 is formed on the element body 3 by baking the paste for insulating layer on the element body 3 after being subjected to the calcination. By employing this structure, it is possible to improve the moisture resistance of the electronic part and to improve the durability to a change of the external environmental such as a thermal shock or a physical shock.

The embodiments of the present invention have been described, but the present invention is not limited to the embodiments described above in any way and may be variously modified within the scope of the present invention.

For example, the internal electrode pattern layer 12a is not limited to the pattern illustrated in FIG. 5Aa and FIG. 5Ab, and may be a pattern having the gap 32 of the grid-like internal electrode pattern layer 12a as illustrated in FIG. 5B, or may be a pattern where a plurality of strip internal electrode pattern layers is arranged at predetermined intervals, although not illustrated.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, a chip inductor, a laminated three-terminal filter, a piezoelectric element, a chip thermistor, a chip varistor, a chip resistor, and other surface mounted (SMD) chip type electronic parts.

EXAMPLES

Hereinafter, the present invention will be described based on further detailed Examples, but the present invention is not limited to these Examples.

Example 1

The capacitor samples (multilayer ceramic capacitor 2) of sample No. 1 to sample No. 8 were fabricated as follows to confirm intrusion of plating solution and evaluate variation of electrostatic capacity.

First, a $BaTiO_3$-based ceramic powder: 100 parts by weight, a polyvinyl butyral resin: 10 parts by weight, dioctyl phthalate (DOP) as a plasticizer: 5 parts by weight, an alcohol as a solvent: 100 parts by weight were mixed and pasted by a ball mill, thereby obtaining a paste for inner green sheet.

In addition, apart from to the above, Ni particles: 44.6 parts by weight, terpineol: 52 parts by weight, ethyl cellulose: 3 parts by weight, and benzotriazole: 0.4 parts by weight were kneaded and formed into to a slurry by a triple roll, thereby preparing a paste for internal electrode layer.

The inner green sheet 10a was formed on a PET film by using the paste for inner green sheet prepared in the above so as to have a thickness after drying of 7 μm. Subsequently, the internal electrode pattern layer 12a was printed thereon in a predetermined pattern by using the paste for internal electrode layer, and the sheet was peeled off from the PET film. Then, the inner green sheet 10a having the internal electrode pattern layer 12a was obtained.

As illustrated in FIG. 4, the internal laminate 13a was manufactured by laminating the inner green sheet 10a having the internal electrode pattern layer 12a, an appropriate number of the outer green sheets 11a was then formed above and below the internal laminate 13a by using the paste for outer green sheet, and the resultant was pressurized and bonded in the laminating direction, thereby obtaining a green laminate. The paste for outer green sheet was obtained by the same method as the paste for inner green sheet.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 60° C./hour, a retention temperature: 260° C., a temperature retention time: 8 hours, and an atmosphere: in the air.

The condition for calcination was set so as to have a rate of temperature rise: 200° C./hour, a retention temperature: from 1000° C. to 1200° C., a temperature retention time: 2 hours, and a cooling speed: 200° C./hour. Incidentally, the atmosphere gas was a humidified $N_2+H_2$ mixed gas.

The condition for annealing was set so as to have a rate of temperature rise: 200° C./hour, a retention temperature: from 500° C. to 1000° C., a temperature retention time: 2 hours, a cooling speed: 200° C./hour, and an atmosphere gas: humidified $N_2$ gas.

Incidentally, a wetter was used for the humidification of the atmosphere gas at the time of calcination and annealing.

Paste for insulating layer to be the insulating layer 16 having different elastic modulus after baking was applied by dipping to each of sample No. 1 to sample No. 8.

The paste for insulating layer was prepared by kneading glass powder, a binder containing ethyl cellulose as the main component, and terpineol and acetone of the dispersion medium by a mixer.

The composition of the glass powder contained the paste for insulating layer was as follows by weight ratio. $SiO_2$: 30 wt %, BaO: 15 wt %, CaO: 15 wt %, SrO: 20 wt %, $Na_2O$: 6 wt %, $K_2O$: 5 wt %, and the remaining part was a minute component.

A coating length W1 of the insulating layer 16 was controlled by adjusting a thickness in the X-axis direction of the paste for insulating layer under a constant lowering time of the element body 3 (30 seconds). The thickness in the X-axis direction of the paste for insulating layer regarding sample No. 1 to sample No. 8 is shown in Table 1.

The chip obtained by coating the paste for insulating layer on the entire surface of the end surface in the X-axis direction, the end portion in the X-axis direction on the end surface in the Y-axis direction, and the end portion in the X-axis direction on the end surface in the Z-axis direction of the element body 3 through dipping and drying the paste was subjected to the binder removal treatment and baking using a belt conveyor furnace to form the insulating layer 16 on the element body 3, thereby obtaining the ceramic sintered body 4. The conditions for drying of the paste for insulating layer, binder removal treatment, and baking were as follows.

Drying
Temperature: 180° C.
Binder removal treatment
Rate of temperature rise: 1000° C./hour
Retention temperature: 500° C.
Temperature retention time: 0.25 hour
Atmosphere: in the air
Baking
Rate of temperature rise: 700° C./hour
Retention temperature: from 700° C. to 1000° C.
Temperature retention time: 0.5 hour
Atmosphere: humidified $N_2$ gas The end surface in the Y-axis direction of the ceramic sintered body 4 thus obtained was polished by barrel treatment.

Next, 100 parts by weight of a mixture of spherical Cu particles having an average particle size of 0.4 μm and a flaky Cu powder, 30 parts by weight of an organic vehicle (one prepared by dissolving 5 parts by weight of an ethyl cellulose resin in 95 parts by weight of butyl carbitol), and 6 parts by weight of butyl carbitol were kneaded to obtain a pasted paste for external electrode.

The obtained paste for external electrode was transcripted on the end surface in the Y-axis direction of the ceramic sintered body 4, baked for 10 minutes at 850° C. in $N_2$ atmosphere to form the external electrodes 6 and 8, and forming a covering layer by plating on the surface of the external electrodes 6 and 8. Then, the multilayer ceramic capacitor 2 was obtained. Incidentally, the external electrodes 6 and 8 of the obtained multilayer ceramic capacitor 2 covered at least part of an insulating layer extension portion 16a formed on the end surface in the Y-axis direction of the element body 3.

The capacitor sample (multilayer ceramic capacitor 2) manufactured in this way had a size of 3.2×2.5×1.5 mm, and the inner dielectric layer 10 was 10-layered. Incidentally, the inner dielectric layer had a thickness of 5.0 μm, the internal electrode layer 12 had a thickness of about 1.2 μm, and a width Wgap of the gap portion was about 20.0 μm.

The capacitor sample and the like thus obtained was measured or evaluated by the following methods.

<W1/W0>

The resin embedding was conducted so that the capacitor sample stood facing down the main surface in the Z-axis direction, and the other main surface was polished along the Z-axis direction of the multilayer ceramic capacitor 2, thereby obtaining a polished cross section having the length of the Z-axis direction of the element body 3 of ½H0. Next, this polished cross section was subjected to ion milling to remove the undercut caused by polishing. A cross section for observation was obtained in this manner.

Next, the width W0 along the X-axis of the element body and the width W1 along the X-axis of the insulating layer extension portion illustrated in FIG. 2 were measured on the cross section. For measuring the widths, a digital microscope (VHX microscope by KEYENCE CORPORATION) was used, observation and measurement were performed by a 2000 magnification lens. Incidentally, the measurement of the angle θ1 is not limited to the above measurement method, but any device capable of performing the observation by 1000 to 3000 magnification may be used.

W0 of the two insulating layers 16 was measured per one sample, and W1 was measured at four places of corners of the insulating layers 16 per one sample. This operation was performed for 30 capacitor samples to calculate an average of W1/W0. This result is shown in Table 3. Incidentally, portions where the insulating layer was defected were not counted.

<Whether there was Intrusion of Plating Solution>

After a copper paste baking film to be a base film of the external electrodes 6 and 8 was formed, 100 ceramic sintered bodies 4 before forming plating were prepared, these were fed into a rotary barrel whose volume is 150 ml (MINI BARREL MODEL 1-BW by YAMAMOTO-MS Co., Ltd.) together with a steel ball of 50 ml whose diameter is 1.2 mm, a Ni anode, a conductive cathode, and a barrel were immersed into a nickel plating bath (watt bath), the barrel was rotated at 0.2 s$^{-1}$ (12 rpm), a current having current density of 5 A/m$^2$ was applied between the anode and the cathode for 240 minutes, the ceramic sintered bodies 4 where the copper paste baking film was formed were Ni electroplated, and a Ni coated film having a film thickness of about 2 μm was formed.

Next, a Sn anode, a conductive cathode, the copper paste baking film, and a barrel containing the ceramic sintered bodies 4 where the Ni coated film was formed were immersed into a Sn plating bath, the barrel was rotated at 0.2 s$^{-1}$, a current having current density of 2.5 A/m$^2$ was applied between the anode and the cathode for 600 minutes, the ceramic sintered bodies 4 where the copper paste baking film and the Ni coated film were formed were Sn electroplated, and a Sn coated film having a film thickness of about 7 μm was formed.

The multilayer ceramic capacitor 2 (capacitor sample) obtained in this way was taken from the barrel. Thereafter, 10 capacitor samples were taken at random from 100 capacitor samples, and whether a plating solution intruded to the interface between the base films of the external electrodes 6 and 8 of the capacitor samples (copper paste baking films) and the ceramic sintered bodies 4. That is, it was determined that whether Sn was detected in the interface between the external electrodes 6 and 8 and the ceramic sintered body 4 by Energy Depressive X-ray Analysis (EDX) with respect to a cross section perpendicular to the end surface where the external electrodes 6 and 8 of the capacitor sample are formed (end surface in the Y-axis direction). This result is shown in Table 1. The values in Table 1 represent a ratio of the number of samples where Sn was detected in the interface between the external electrodes 6 and 8 and the ceramic sintered body 4 with respect to the number of samples evaluated. Incidentally, a sample where Sn was detected by 2 atom % or more was regarded a sample where Sn was detected.

<Variation of Electrostatic Capacity>

The electrostatic capacity of 100 capacitor samples (multilayer ceramic capacitors 2) after forming plating was measured using a LCT meter. Incidentally, the electrostatic capacity was measured at a frequency of 1 kHz and 0.5 Vrms. The predetermined electrostatic capacity (1 μF) was considered as 100%, and a variation of electrostatic capacity was defined as percentage of average value of absolute value of the difference between actual electrostatic capacity value and the predetermined electrostatic capacity value. The result is shown in Table 1.

TABLE 1

| Example 1 Sample number | Thickness of paste (μm) | W1/W0 | Whether there was intrusion of plating solution measured after plating step | Variation of electrostatic capacity |
|---|---|---|---|---|
| 1 | 50 | No coating | X: 50% | ○: 2% |
| 2 | 55 | 1/50 | X: 20% | ○: 2% |
| 3 | 70 | 1/30 | ○: 1% | ○: 3% |
| 4 | 75 | 1/20 | ○: 0% | ○: 2% |
| 5 | 80 | 1/15 | ○: 0% | ○: 3% |
| 6 | 85 | 1/10 | ○: 0% | ○: 2% |
| 7 | 90 | 5/12 | ○: 0% | X: 25% |
| 8 | 100 | 11/24 | ○: 0% | X: 80% |

According to Table 1, it was confirmed that there was no intrusion of plating solution when W1/W0 was more than 1/50 and less than 5/12 (sample No. 3 to sample No. 6).

In contrast, it was confirmed that there was intrusion of plating solution when W1/W0 was 1/50 or less (sample No. 1 and sample No. 2).

According to Table 1, it was confirmed that variation of electrostatic capacity was good when W1/W0 was more than 1/50 and less than 5/12 (sample No. 3 to sample No. 6), compared with when W1/W0 was 5/12 or more (sample No. 7 and sample No. 8).

It is considered that since W1/W0 of sample No. 7 and sample No. 8 was too large, a contact area of the external electrodes and the internal electrode layer contact with each other is small, and as a result, the variation of electrostatic capacity became large.

Example 2

Except for "composition of paste for insulating layer", "baking retention time of paste for insulating layer", and "retention time at maximum temperature of baking paste for insulating layer", capacitor samples of sample No. 11 to sample No. 18 (multilayer ceramic capacitor 2) were fabricated in the same manner as Example 1, and measurement of W1/W0, confirmation whether plating solution intrudes, evaluation of variation of electrostatic capacity, measurement of the angle θ1 of the peripheral edge portion, and evaluation of crack incidence rate at corners after thermal shock resistance test were performed. The result is shown in Table 2.

Incidentally, the measurement of W1/W0, whether there was intrusion of plating solution, and evaluation of variation of electrostatic capacity of sample No. 11 to sample No. 18 were performed in the same manner as Example 1. The measurement of the angle θ1 of the peripheral edge portion and the evaluation of corner crack incidence rate after the thermal shock resistance test were mentioned below.

First, paste for insulating layer to be the insulating layer 16 having the same elastic modulus after baking was used for "paste for insulating layer" of sample No. 11 to sample no. 18.

The amount of α-terpineol in the paste for insulating layer was adjusted so that this paste for insulating layer had a viscosity described in Table 2.

Furthermore, the retention temperature at the time of baking the paste for insulating layer was 700° C., and the angle of the insulating layer 16 of the peripheral edge portion was controlled by adjusting the retention time at the maximum temperature of baking to the time described in Table 2.

substrate and a capacitor sample for 30 minutes under temperature condition where temperature of the capacitor sample was −55° C., the step (ii) of increasing the temperature of the capacitor sample to 125° C. within 10% time (3 minutes) of the above retention time, the step (iii) of retaining the temperature condition of the capacitor sample of 125° C. for 30 minutes, and the step (iv) of decreasing the temperature of the capacitor sample to −55° C. within 10% time (3 minutes) of the above retention time.

Next, structural defect of the capacitor sample after the thermal shock resistance test was examined. A stereomicroscope was used to observe the polished cross section in the same manner as measuring the angle θ1 of the above peripheral edge portion, and each crack incidence rate at corners of 20 capacitor samples was calculated. Incidentally, the crack includes fracture as well. In this time, a crack generated at a place other than the corners was not counted.

TABLE 2

| Example 2 Sample number | Viscosity of paste (Pa · s) | Baking retention time (min) | W1/W0 | Whether there was intrusion of plating solution measured after plating step | Variation of electrostatic capacity | Angle θ1 of the peripheral edge portion (°) | Corner crack incidence rate after thermal shock resistance test (%) |
|---|---|---|---|---|---|---|---|
| 11 | 45 | 40 | 1/30 | ○: 0% | ○: 2% | 15 | 0 |
| 12 | 45 | 40 | 1/20 | ○: 0% | ○: 2% | 15 | 0 |
| 13 | 80 | 20 | 1/30 | ○: 0% | ○: 3% | 24 | 0 |
| 14 | 80 | 20 | 1/20 | ○: 0% | ○: 2% | 24 | 0 |
| 15 | 102 | 5 | 1/20 | ○: 0% | ○: 3% | 30 | 0 |
| 16 | 102 | 5 | 1/10 | ○: 0% | ○: 2% | 30 | 0 |
| 17 | 120 | 2 | 1/10 | ○: 0% | ○: 2% | 50 | 12 |
| 18 | 120 | 2 | 1/5 | ○: 0% | ○: 3% | 50 | 15 |

The method for measuring the angle θ1 of the peripheral edge portion and the method for evaluating corner crack incidence rate after the thermal shock resistance test were as below.

<Angle θ1 of Peripheral Edge Portion>

The resin embedding was conducted so that the multilayer ceramic capacitor 2 stood facing down the main surface in the Z-axis direction, and the other main surface was polished along the Z-axis direction of the multilayer ceramic capacitor 2, thereby obtaining a polished cross section having the length of the Z-axis direction of the element body 3 of ½H0. Next, this polished cross section was subjected to ion milling to remove the undercut caused by polishing. A cross section for observation was obtained in this manner.

Next, the angle θ1 of the peripheral edge portion of the insulating layer 16 shown in FIG. 3 was measured on the cross section. W1 was measured at four places of corners of the insulating layers 16 per one capacitor sample. This operation was performed for 30 capacitor samples to calculate an average of the angle θ1. This result is shown in Table 2. Incidentally, portions where the insulating layer was defected were not counted.

For measuring the angle θ1, a digital microscope (VHX microscope by KEYENCE CORPORATION) was used, a 2000 magnification lens was used for observation, and the angle was measured by protractor after extracting images. Incidentally, the measurement of the angle θ1 is not limited to the above measurement method, but any device capable of performing the observation by 1000 to 3000 magnification may be used.

<Corner Crack Incidence Rate after Thermal Shock Resistance Test>

A heat treatment cycle composed of the following step (i) to step (iv) was performed to the capacitor sample. The heat treatment cycle is composed of the step (i) of retaining a According to Table 2, it was confirmed that a corner crack incidence rate after the thermal shock resistance test was good when the angle θ1 of the peripheral edge portion was less than 50 degrees (sample No. 11 to sample No. 16), compared with when the angle θ1 of the peripheral edge portion was 50 degrees or more (sample No. 17 and sample No. 18).

Example 3

Except that the elastic modulus of the insulating layer 16 was as described in Table 3, the paste viscosity was 102 Pa·s, paste for insulating layer whose composition was as described in Table 4 was used, and a baking retention time by belt conveyor furnace was seven minutes, capacitor samples (multilayer ceramic capacitors 2) of sample No. 19 to sample No. 27 were fabricated in the same manner as Example 1, elastic modulus, the angle θ1 of the peripheral edge portion, and W1/W0 were measured, whether there was intrusion of plating solution was confirmed, variation of electrostatic capacity and corner crack incidence rate after AC withstand voltage test were performed. The result is shown in Table 3.

Incidentally, measurement of the angle θ1 of the peripheral edge portion and W1/W0 of sample No. 19 to sample No. 27, confirmation of whether there was intrusion of plating solution, evaluation of variation of electrostatic capacity were performed in the same manner as Example 1 or Example 2. The method for measuring elastic modulus and the method for evaluating corner crack incidence rate after the AC withstand voltage test were as below.

<Elastic Modulus>

Elastic modulus was measured by indentation depth test due to nano-indentation to the end surface in the X-axis direction of the capacitor sample. The result is shown in Table 3. The specific method is as below. Incidentally, ENT-1100a (by ELIONIX INC.) was used for the indentation test device.
(1) First, the end surface in the X-axis direction of the capacitor sample was placed on a sample stage with the end surface faced upward and fixed by hot wax.
(2) Thereafter, the indentation test was performed under a measuring condition of the indentation maximum load of 500 mN so that a diamond indentor was positioned at the center on the end surface in the X-axis direction of the capacitor sample.

<Corner Crack Incidence Rate after AC Withstand Voltage Test>

Electrostriction was caused to the capacitor sample by performing the AC withstand voltage test, and a crack incidence rate at corners was examined. The AC withstand voltage test was measured using an insulation resistance meter. A voltage where electric discharge began by applying AC voltage of 50 Hz at a pressure rising rate of 30 Vrms/sec in the air was measured. Next, whether there was a crack at the corners after dielectric breakdown test was examined. The crack incidence rate at the corners was respectively calculated by observing polished cross section in the same manner as measuring the angle θ1 of the peripheral edge portion mentioned above by the stereomicroscope. The result is shown in Table 3. Incidentally, a crack generated at a place other than the corners was not counted.

Example 4

Except for "elastic modulus of insulating layer" and "thickness of paste for insulating layer applied to element body", capacitor samples (multilayer ceramic capacitors 2) of sample No. 28 to sample No. 36 were fabricated in the same manner as Example 1, elastic modulus, the angle θ1 of the peripheral edge portion, W1/W0, and Mf/Mt were measured, and fixing strength was evaluated. The result is shown in Table 5.

Incidentally, the elastic modulus, the angle θ1 of the peripheral edge portion, and W1/W0 of sample No. 28 to sample No. 36 were measured in the same manner as Example 1 to Example 3. The measurement of Mf/Mt and the evaluation of fixing strength were as below.

First, paste for insulating layer to be the insulating layer 16 having the same elastic modulus was used for sample No. 28 to sample No. 36.

Regarding "thickness of paste for insulating layer applied to element body", W1 and Mf/Mt were controlled by adjusting a lowering time of the element body 3 and the number of times as described in Table 5 to change a thickness of the paste for insulating layer.

<Mf/Mt>

A cross section for observation was obtained in the same manner as the measurement of the angle θ1 of the peripheral edge portion.

TABLE 3

| Example 3 Sample number | Elastic modulus (Gpa) | Angle θ1 of peripheral edge portion (°) | W1/W0 | Whether there was intrusion of plating solution measured after plating step | Variation of electrostatic capacity | Corner crack incidence rate after AC withstand voltage test (%) |
|---|---|---|---|---|---|---|
| 19 | 18 | 30 | 1/30 | ○: 0% | ○: 2% | 12 |
| 20 | 25 | 24 | 1/30 | ○: 0% | ○: 2% | 10 |
| 21 | 35 | 27 | 1/15 | ○: 0% | ○: 3% | 1 |
| 22 | 59 | 32 | 1/15 | ○: 0% | ○: 2% | 0 |
| 23 | 80 | 23 | 1/30 | ○: 0% | ○: 3% | 0 |
| 24 | 92 | 25 | 1/20 | ○: 0% | ○: 2% | 1 |
| 25 | 105 | 31 | 1/20 | ○: 0% | ○: 2% | 11 |
| 26 | 120 | 30 | 1/10 | ○: 0% | ○: 3% | 9 |
| 27 | 150 | 25 | 1/12 | ○: 1% | ○: 4% | 11 |

TABLE 4

| Example 3 Sample number | SiO$_2$ | B$_2$O$_3$ | BaO | SrO | Na$_2$O | ZnO | TiO$_2$ | Al$_2$O$_3$ | CaO | Softening point (° C.) |
|---|---|---|---|---|---|---|---|---|---|---|
| 19 | — | ○ | ○ | — | ○ | ○ | — | — | — | 576 |
| 20 | ○ | ○ | ○ | — | ○ | — | — | — | — | 590 |
| 21 | ○ | — | ○ | — | ○ | ○ | — | — | — | 623 |
| 22 | ○ | — | ○ | — | — | ○ | — | — | ○ | 680 |
| 23 | ○ | — | ○ | ○ | — | — | — | — | ○ | 740 |
| 24 | ○ | — | — | ○ | — | — | ○ | — | — | 784 |
| 25 | ○ | — | — | ○ | — | — | ○ | — | ○ | 760 |
| 26 | ○ | — | — | — | — | — | ○ | ○ | ○ | 804 |
| 27 | — | — | ○ | — | — | — | ○ | — | — | — |

According to Table 3, it was confirmed that a corner crack incidence rate after the AC withstand voltage test was good when the elastic modulus was more than 25 GPa to less than 105 GPa (sample No. 21 to sample No. 24), compared with when the elastic modulus was 25 GPa or less (sample No. 19 and sample No. 20) and when the elastic modulus was 105 GPa or more (sample No. 25 to sample No. 27).

Next, Mf and Mt shown in FIG. 3 were measured on the cross section. Mf/Mt was calculated at four points of corners of the insulating layer 16 per one capacitor sample. This operation was performed for 30 capacitor samples to calculate an average of Mf/Mt. This result is shown in Table 5. Incidentally, portions where the insulating layer was defected were not counted.

Incidentally, a digital microscope (VHX microscope by KEYENCE CORPORATION) was used to measure Mf and Mt, and observation and measurement were performed by a 5000 magnification lens.

<Fixing Strength>

Figure 7:
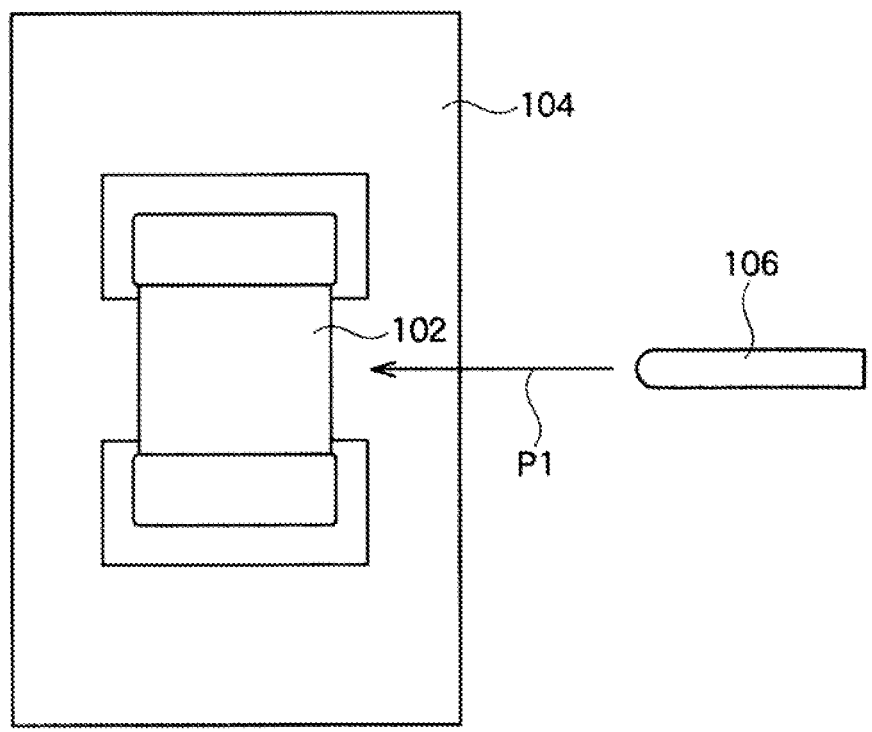
FIG. 7 is a schematic view for explaining a method for measuring fixing strength of the present Example.

With regard to fixing strength, as illustrated in FIG. 7, a cemented carbide pressurizing jig 106 was directed toward the end surface in the X-axis direction of the capacitor sample 102 at a rate of 30 mm/min in a state in which the capacitor sample 102 was mounted on the circuit board 104, and the capacitor sample 102 was pressurized by the pressurizing jig 106 4 N from the direction of an arrow P1. In this time, fixing strength was evaluated by whether the capacitor sample 102 was broken due to a load of 10N. The test was performed for 100 capacitor samples. The result is shown in Table 5. As the evaluation standard, the fact that a defect ratio of fixing strength was less than 10% was considered to be more favorable, and the fact that a defect ratio of fixing strength was 10% to less than 15% was considered to be favorable. Incidentally, the inner structure of the capacitor sample 102 according to the present embodiment was the same as that of the multilayer ceramic capacitor 2 shown in FIG. 1.

TABLE 5

| Example 4 Sample number | Elastic modulus (Gpa) | Dipping time (sec) | Number of times of dipping (times) | Angle θ1 of peripheral edge portion (°) | W1/W0 | Mf/Mt | Fixing strength |
| --- | --- | --- | --- | --- | --- | --- | --- |
| 28 | 59 | 30 | 1 | 32 | 1/20 | 0.7 | ◎: 3% |
| 29 | 59 | 10 | 1 | 21 | 1/25 | 0.1 | ○: 12% |
| 30 | 59 | 20 | 1 | 29 | 1/21 | 0.5 | ◎: 5% |
| 31 | 59 | 30 | 1 | 22 | 1/24 | 0.8 | ◎: 2% |
| 32 | 59 | 45 | 2 | 33 | 1/23 | 1.0 | ◎: 2% |
| 33 | 59 | 60 | 2 | 18 | 1/27 | 1.5 | ◎: 3% |
| 34 | 59 | 75 | 3 | 30 | 1/25 | 2.0 | ◎: 5% |
| 35 | 59 | 90 | 3 | 21 | 1/23 | 2.2 | ○: 13% |
| 36 | 59 | 105 | 3 | 31 | 1/21 | 2.5 | ○: 16% |

According to Table 5, it was confirmed that fixing strength was favorable when Mf/Mt was more than 0.1 to less than 2.2 (sample No. 28 and sample No. 30 to sample No. 34), compared with when Mf/Mt was 0.1 (sample No. 29) and when Mf/Mt was 2.2 or more (sample No. 35 and sample No. 36).

Example 5

Sample No. 37 was fabricated in the same manner as Example 1 except that paste for insulating layer to have elastic modulus of the insulating layer 16 described in Table 6 was used, the retention temperature at the time of baking the paste for insulating layer was 700° C., and the insulating layer 16 was glass.

Sample No. 38 was fabricated in the same manner as Example 1 except that resin to have elastic modulus of the insulating layer 16 described in Table 6 was used instead of paste for insulating layer, the element body 3 is applied with the resin and dried at 180° C., and neither binder removal treatment nor baking was performed. Incidentally, the resin contained a filler.

Furthermore, sample No. 39 was fabricated in the same manner as Example 1 except that the retention temperature at the baking was 1000° C. by changing the component of the paste for insulating layer to the ceramic having elastic modulus of the insulating layer 16 described in Table 6.

With respect to sample No. 37 to sample No. 39, the corner crack incidence rate after the thermal shock resistance test, the corner crack incidence rate after the AC withstand voltage test, and the fixing strength were evaluated in the same manner as Example 2 to Example 4. The result is shown in Table 6.

TABLE 6

| Example 5 Sample number | Elastic modulus (Gpa) | W1/W0 | Mf/Mt | Insulating layer | Corner crack incidence rate after thermal shock resistance test (%) | Corner crack incidence rate after AC withstand voltage test (%) | Fixing strength |
| --- | --- | --- | --- | --- | --- | --- | --- |
| 37 | 68 | 1/30 | 0.5 | Glass | 0 | 0 | ◎: 3% |
| 38 | 32 | 1/30 | 0.3 | Resin (containing filler) | 0 | 0 | ○: 12% |
| 39 | 90 | 1/30 | 0.7 | Ceramic | 0 | 0 | ○: 14% |

According to Table 6, it was confirmed that the fixing strength was good when the insulating layer was glass (sample No. 37), compared with when the insulating layer was the resin (containing the filler; sample No. 38) or when the insulating layer was the ceramic (sample No. 39).

INDUSTRIAL APPLICABILITY

As described above, the multilayer electronic component according to the present invention is useful as an electronic part to be used in laptop computers or smart phones which are often used to have a great capacity while being compact.

EXPLANATIONS OF LETTERS OR NUMERALS 2, 102 . . . multilayer ceramic capacitor
3 . . . element body
4 . . . ceramic sintered body
6 . . . first external electrode
8 . . . second external electrode
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
16a . . . insulating layer extension portion
20 . . . step absorbing layer
32 . . . gap between internal electrode pattern layers
40 . . . solder
42, 104 . . . circuit board
106 . . . pressurizing jig

The invention claimed is:

1. A multilayer electronic component comprising an element body having an internal electrode layer and a dielectric layer, both of which are substantially parallel to a plane including a first axis and a second axis and are alternately laminated along a third axis direction, wherein
  a pair of side surfaces facing each other in the first axis direction of the element body is respectively equipped with an insulating layer,
  a pair of end surfaces facing each other in the second axis direction of the element body is respectively equipped with an external electrode electrically connected to the internal electrode layer,
  the insulating layer integrally has an insulating layer extension portion covering part of the end surfaces facing each other in the second axis direction of the element body,
  W1/W0 is 1/30 to less than 3/8, where
  W0 denotes a width along the first axis of the element body and
  W1 denotes a width along the first axis of the insulating layer extension portion formed on the end surfaces in the second axis direction of the element body, and
  the external electrode covers at least part of the insulating layer extension portion formed on the end surfaces in the second axis direction of the element body.

2. The multilayer electronic component according to claim 1, wherein
  an angle θ1 made by a virtual line along the end surface of the element body and a tangential line of a curved surface of a peripheral edge portion of the insulating layer extension portion formed on the end surfaces in the second axis direction of the element body is 45 degrees or less.

3. The multilayer electronic component according to claim 1, wherein
  an elastic modulus of the insulating layer is 30 GPa to 100 GPa.

4. The multilayer electronic component according to claim 2, wherein
  an elastic modulus of the insulating layer is 30 GPa to 100 GPa.

5. The multilayer electronic component according to claim 1, wherein
  $0.5 \leq Mf/Mt \leq 2.0$ is satisfied, where
  Mf denotes a maximum thickness in the second axis direction of the insulating layer from the end surface of the element body and
  Mt denotes a maximum thickness in the first axis direction of the insulating layer from the side surface of the element body.

6. The multilayer electronic component according to claim 2, wherein
  $0.5 \leq Mf/Mt \leq 2.0$ is satisfied, where
  Mf denotes a maximum thickness in the second axis direction of the insulating layer from the end surface of the element body and
  Mt denotes a maximum thickness in the first axis direction of the insulating layer from the side surface of the element body.

7. The multilayer electronic component according to claim 3, wherein
  $0.5 \leq Mf/Mt \leq 2.0$ is satisfied, where
  Mf denotes a maximum thickness in the second axis direction of the insulating layer from the end surface of the element body and
  Mt denotes a maximum thickness in the first axis direction of the insulating layer from the side surface of the element body.

8. The multilayer electronic component according to claim 4, wherein
  $0.5 \leq Mf/Mt \leq 2.0$ is satisfied, where
  Mf denotes a maximum thickness in the second axis direction of the insulating layer from the end surface of the element body and
  Mt denotes a maximum thickness in the first axis direction of the insulating layer from the side surface of the element body.

9. The multilayer electronic component according to claim 1, wherein
  the insulating layer is constituted by a glass component.

10. The multilayer electronic component according to claim 2, wherein
  the insulating layer is constituted by a glass component.

11. The multilayer electronic component according to claim 3, wherein
  the insulating layer is constituted by a glass component.

12. The multilayer electronic component according to claim 4, wherein
  the insulating layer is constituted by a glass component.

13. The multilayer electronic component according to claim 5, wherein
  the insulating layer is constituted by a glass component.

14. The multilayer electronic component according to claim 6, wherein
  the insulating layer is constituted by a glass component.

15. The multilayer electronic component according to claim 7, wherein
the insulating layer is constituted by a glass component.

16. The multilayer electronic component according to claim 8, wherein
the insulating layer is constituted by a glass component.

* * * * *